United States Patent [19]

Lambert

[11] Patent Number: 4,943,861
[45] Date of Patent: Jul. 24, 1990

[54] APPARATUS AND METHOD FOR EXPOSING PHOTOSENSITIVE RECORDING MEDIA WITH DIGITAL IMAGE DATA

[75] Inventor: Thomas W. Lambert, Dousman, Wis.

[73] Assignee: Analogic Corporation, Peabody, Mass.

[21] Appl. No.: 21,308

[22] Filed: Mar. 3, 1987

[51] Int. Cl.$^5$ .......................... H04N 5/84; G11B 7/00
[52] U.S. Cl. .................................... 358/244; 358/345; 358/164; 346/76 L; 346/110 R; 369/100; 369/121
[58] Field of Search ................. 358/164, 244, 345, 32, 358/332, 302; 346/110 R, 76 L; 354/5–7, 12; 369/100, 121

[56] References Cited

U.S. PATENT DOCUMENTS 4,473,849 9/1984 Cool ................................ 358/345 X Primary Examiner—Robert L. Richardson

[57] ABSTRACT

An apparatus and method are provided for recording images on photon sensitive recording media (20) which includes a source (12) of image pixel data in digital form having a multiplicity of possible intensity values, a photon generator 16 for exposing the photon sensitive recording media at a fixed intensity level, and a controller (24, 22, 14) for controlling the amount of time of exposure of the recording media in correspondence with the pixel data intensity values from the source. Previously known apparatus either have problems producing clearly distinguishable shades of gray on the recording media or else require much more expensive technology. The most likely applications are the production of hard copy from medical imaging data where clarity and detail are the most important consideration. Other applications may prove feasible with any form of digitizable image data.

13 Claims, 1 Drawing Sheet

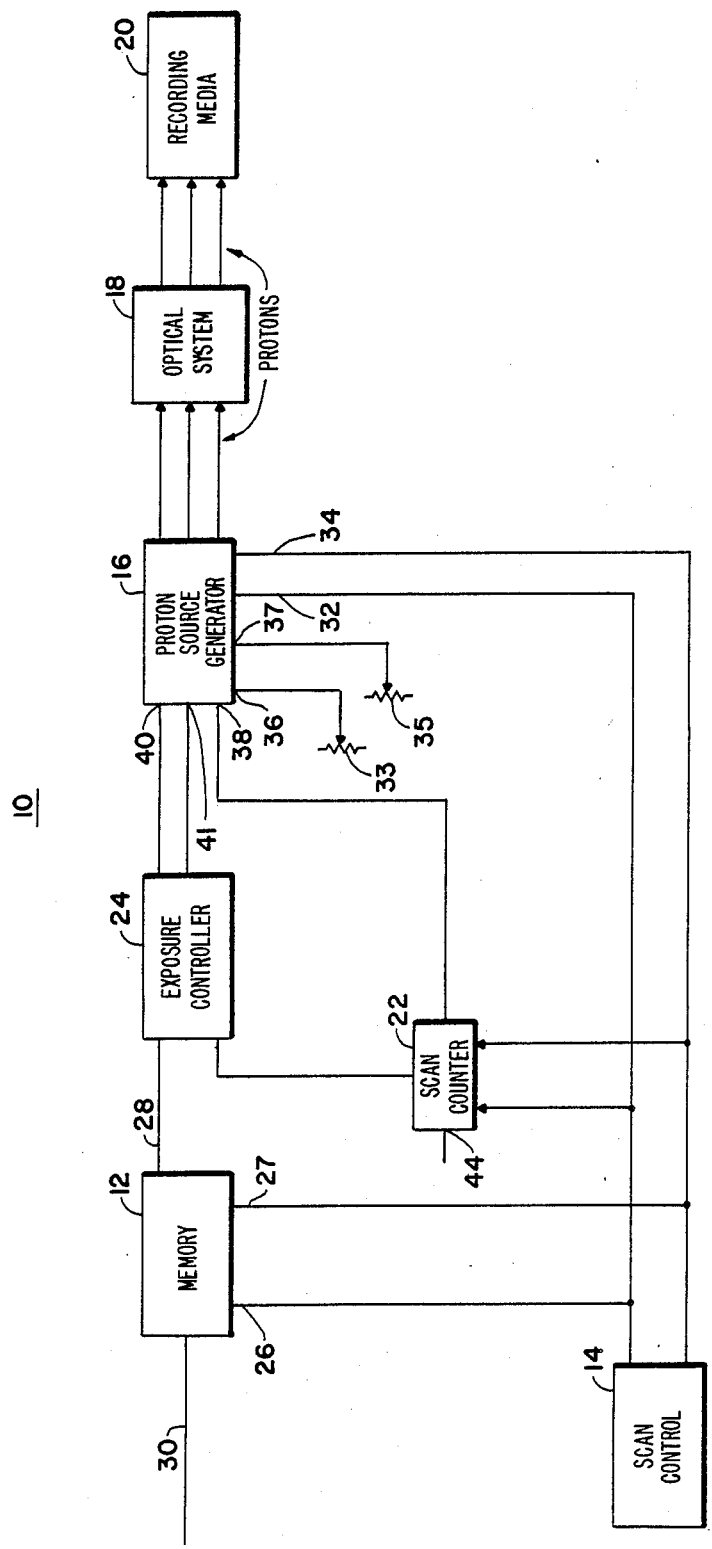

APPARATUS AND METHOD FOR EXPOSING PHOTOSENSITIVE RECORDING MEDIA WITH DIGITAL IMAGE DATA

BACKGROUND OF THE INVENTION

Field of the Invention

The present invention generally relates to apparatus for producing a hard copy from electronic image data by photographic means and, in particular, to applications of such, as in medical imaging, which require a high degree of distinction between shades of gray for purposes of clarity and definition.

Statement of the Prior Art

A great deal of development work has been done in the area of medical imaging which has become an extremely powerful diagnostic tool when coupled with the technologies of CAT scanning, ultrasonic scanning and magnetic resonance imaging. The electronic signals produced by these forms of imaging most readily lend themselves to the use of electronic image data and the production of images through electronic image processing. Such electronic image data is of course easily recorded; However, there is still a significant need for the production of hard copy images for a variety of reasons and purposes. To this end, different photographic printers have been developed. The simplest example of these printers would be the photographing of an image as displayed by a cathode ray tube. More complex printers have also been developed wherein cathode ray tubes and lasers are used to expose a photon sensitive recording media on a scanned, line-by-line basis. Any suitable photosensitive or photon sensitive media may typically be used such as visible light sensitive photographic film, infra-red sensitive photographic film, photo-stimulable phosphor, dry silver paper and so on.

One of the areas of difficulty and therefore a performance criteria for the production of such hard copy, has been the definition of the images so produced. Definition is generally determined by the fineness of the signals or pixels used and the definition between shades in each pixel. The definition between shades is determined by the ability to clearly distinguish on hard copy between close but different signal levels in the image data being used.

In practice, the ability to produce distinctions in shades of gray is limited by the apparatus used to expose the recording media and the recording media itself. The best images thus far, have been produced via laser printing. The definition provided, however, has only come at a high price, due to the need for laser technology and the circuitry necessary to provide quality images therewith. Cathode ray technology is much less expensive than lasers but suffers from several problems in its ability to produce clearly defined shades of gray. These difficulties primarily arise from the difficulty of linearly exposing the recording media in response to the electronic image data. The non-linearities generally arise from each step of the process. The image data, which is typically digital, must first be converted to an analog signal by a digital to analog converter. The next step or source of non-linearities is amplifying the analog voltage, with a video drive amplifier, to a voltage which can be used to modulate the intensity of a cathode ray beam. Still another source of non-linearity arises from cathode ray tubes where the light intensity of the cathode ray phosphor has a non-linear response to the energizing analog intensity voltage. Lastly, inaccuracies are produced by changes in the spot size of the cathode ray phosphor for different electron beam intensities. Although a great deal of development work has been done to reduce these inaccuracies, such as improving the linearity of digital to analog converters, improving the linearity of video drive amplifiers, providing compensation circuitry for the cathode ray phosphor response and improving spot size uniformity, these advances are only available at a cost which reduces the attractiveness of cathode ray printing. Furthermore, the wide variety of parameters which affect cathode ray intensity response can only be optimized at best. They cannot be eliminated.

SUMMARY OF THE INVENTION

Accordingly, an apparatus is provided for recording images on photosensitive recording media which takes advantage of inexpensive cathode ray technology while avoiding the non-linearity problems associated therewith to provide a very competitive alternative to laser printing. The present invention generally comprises a source of pixel data in digital form having a multiplicity of possible intensity values, photon generator means for exposing the photon sensitive recording media at a fixed intensity level, and means for controlling the amount of time of exposure of the recording media in correspondence with the pixel data intensity values. In a preferred embodiment the multiplicity of intensity values are multiples of a lowest intensity value greater than zero and the photon generator means includes means for scanning at least a portion of the recording media for causing exposure thereof which corresponds to the lowest intensity value. The method of the present invention generally includes receiving the image pixel data in digital form with a multiplicity of possible intensity values, exposing the photon sensitive recording media with photons at a fixed intensity level, and controlling the amount of time of the exposing in correspondence with the intensity values represented by the pixel data.

DESCRIPTION OF THE DRAWING

The present invention is illustratively described below in reference to the appended drawing which is a schematic block diagram of one embodiment of the present invention.

Generally shown in the FIGURE is an apparatus 10 for recording an image on photon sensitive recording media and including a memory means 12, a scan controller 14, a binary switched photon source or generator means 16, an optical system 18 for transferring photons produced by generator means 16, the photon sensitive recording media 20, scan counter 22 and an exposure controller 24.

Memory 12 is used to store the image being printed on the recording media 20. It generally includes N rows by M columns of pixels with each pixel having z binary bits of definition. In this form each of the bits of intensity values is a multiple of the lowest possible value greater than zero. Memory 12 includes a pair of xy inputs 26, 27 which are used for addressing the memory in accordance with the N rows and M columns so that each and every pixel may be read out over a z bit bus 28. Memory 12 may also be addressed via lines 26 and 27 to allow a digital signal to be stored therein via an input bus 30. This input signal may be derived from any suitable source such as the digital output of an image processing system or the digitization of an analog video signal further derived from any source. Memory 12 may be constructed in any form suitable for receiving the digital image data.

The binary switched photon source or generator means 16 may take any form such as a cathode ray tube, or a mechanically scanned laser of either the gas or semiconductor variety. The typical inputs required of the functional block 16 for purposes of the present embodiment, are scan control lines 32, 34, intensity selection inputs 36, 37, a blanking input 38, and an on/off beam switch inputs 40, 41. As in the cathode ray tube, the photon generator 16 should include means for producing a source beam of photons and means for causing the beam to scan the recording media. This means for scanning the media would take the form of a magnetic deflection yoke in a cathode ray tube or the scanning mirrors of a laser. The implementation of these various inputs may be easily achieved by persons skilled in the art and in accordance with the particular embodiment of photon generator means used.

The purpose of the xy scan control inputs 32, 34 is to allow scan controller 14 to control the position of the photon beam on the recording media 20. Thus, scan controller 14 can coordinate the data pixels read from memory 12 with the position of the beam for accurately reproducing the image. The intensity level inputs 36, 37 maintain the photon beam intensity level at one or more fixed levels while the pixel data is used to switch them either on or off. The broadest form contemplated for the present invention would require only a single fixed intensity level for the photon generator 16. This single intensity level would correspond to the lowest intensity value of the pixel data, which in practice may be either the least significant bit or a higher order bit. A preferred embodiment speeds printing by also having available a second fixed intensity level for the photon source. The second fixed intensity level is a multiple of the first fixed intensity level of approximately 10. It may be desirable to have the intensity level input adjustable for calibration purposes and also for variation between the photosensitivity of different recording media. For this purpose, potentiometers 33, 35 are illustratively shown coupled to inputs 36, 37. The blanking input 38 allows the switching off of the photon generator as described below. It may be constructed in conjunction with the on/off beam switch inputs 40, 41 shown here as separate inputs. Beam switch inputs 40, 41 control activation of the photon source to the extent of switching it either off or on at either of the two intensity levels. Thus the intensity levels which are held constant by the inputs 36, 37 are not varied during the exposure process.

Scan controller 14 is used to address the memory 12 for the handling of pixel data and also used to control the photon source 16. Scan controller 14 may be constituted in any form suitable to perform the functions recited herein and may be programmed to read the pixels from memory 12 in any desired format. Examples of different formats are a raster scan which reads alternate lines of pixel data, a raster scan which reads sequential lines of pixel data, any partial image format such as the reading of a single row, a single column or even a single point, or any repeatable pattern within an image, the pixels for which may be suitably read from memory 12. Controller 14 also includes means for repetitively addressing memory 12 over the same pattern of pixels while controlling generator 16. In one embodiment the number of times which each repetitive scan is performed is equal to the number of different intensity values stored in the memory 12. Thus, if there are z bits of intensity for each pixel, there are $2^z$ different intensity levels and a complete scan of the data points having these possible levels is performed a total number of $2^z$ times.

Scan counter 22 is used to count the number of the particular scans being performed on the recording media 20. Scan counter 22 receives as its input one or more of the xy address lines from scan controller 14, depending upon the format of repetitive scanning being used. Thus, if a raster scan is being used, scan counter counts each successive complete scan and outputs that number over a line 42 to the exposure controller 24. If only a single row or column of the recording media 20 and its corresponding memory pixels from memory 12 are being scanned, the scan counter 14 simply counts the number of times that the particular line is scanned and likewise outputs that number over the line 42. A start input 44 may be used to zero the exposure counter whenever a new series of repetitive scans is initialized by the scan controller 14. Scan counter 22 may further determine when the total number of scans performed equals the total number of intensity levels stored in memory 12 and activate an exposure stop signal coupled to the blanking input 38 of the photon source 16 to cause the exposure process of the recording media 20 to end.

Exposure controller 24 generally controls the amount of time of exposure of the recording media 20 in correspondence with the pixel data intensity values from memory 12. This is done in conjunction with scan counter 22 which together with exposure controller 24 and scan controller 14 may be considered to be a means for controlling the amount of time of exposure. Exposure controller 24 controls the exposure by activating the photon generator 16 in response to the pixel data and the number of each particular scan from scan counter 22. Any suitable means may be used to effect exposure controller 24. If only a single fixed intensity level is used in photon generator 16, then a simple comparator can be provided as exposure controller 24. This comparator would simply compare pixel data from memory 12 during repetitive scans thereof against the number of each particular scan in a procedure described below. If two fixed intensity levels are used in photon generator 16, then a look-up table or memory can be provided as exposure controller 24. The look-up table would receive the pixel data and the scan count as its addressing inputs, and activation of the photon generator 16 would depend upon the data stored in the table. Thus it should be understood that the functional block representing exposure controller 24 may be readily implemented by either a comparator or a look-up table.

Control and coordination of the function blocks described herein may be readily achieved by any suitable means by persons skilled in the art. This control and coordination may be optimized for cost with a single printing format or it may be optimized for flexibility with a microprocessor or a bit slice processor and additional controls, all of which would be within the commonly known state of the art given the description and functions set forth herein.

OPERATION

The principal theory under which the present invention operates for purposes of avoiding the various linearity problems with intensity modulation is the use of time modulation of the exposure of the recording media 20 in accordance with the intensity pixel data. Pixels may either be exposed one at a time for the time period representative of the intensity value of the pixel or a series or all of the pixels may be exposed while the particular scan format chosen is repetitively scanned by the photon generator and is switched on and off in accordance with the intensity pixel data as shown in the above embodiment.

A more specific explanation of this latter process is applicable to the operation of the disclosed embodiment. Image pixel intensity data is stored in the memory 12 to the extent of eight bits of intensity levels per pixel by way of example. This image pixel data may be derived in any suitable form such as directly from a digital image processor coupled to any suitable medical imaging device or an analog video signal which is digitized and then stored in the memory 12. The analog video signal may be in the form of various archived medical and other video images which are intended for hard copy. Data input and output to the memory 12 is controlled by the scan controller 14.

Taking, by way of example, a raster scan using either alternate or sequential horizontal line printing and the use of a single fixed intensity level for photon generator 16, scan controller 14 causes the entire image in memory 12 to be read out in the selected format while simultaneously controlling the position of the photon beam produced by the photon generator means 16. This image data is repetitively read out of memory 12 while the photon beam is repetitively scanned over the same pattern of the recording media 20, keeping in mind that while the position of the photon beam is determined by scan controller 14 the photon beam is switched on and off for different pixels in accordance with the pixel data in memory 12. While the image is repetitively read from memory 12 scan counter 22 counts each repetition of the entire image. Here the entire image is counted because it is the entire image which is repetitively being scanned. When it is a single line in the form of a row or column which is being read out of memory and scanned, then scan counter 22 would simply count the number of repetitive scans of that row or column. The 8 bits of pixel data provide a possibility of $2^8$ or 256 different intensity values. Therefore memory controller 14 causes the photon source to repetitively scan the recording media 256 times.

For each value of pixel data which is greater than the number of the scan being performed, a comparator forming exposure controller 24 switches photon source 16 on. Thus, if the intensity value recorded for a pixel is simply the least significant bit or a relative value of 1, the photon source 16 is switched on in positional correspondence with that bit during only the first repetitive scan of the image. During subsequent scans of the image at the position of that pixel, the photon source 16 is switched off. If the relative value of intensity of a pixel is 20, the photon source 16 is switched on for that pixel during each of the first 20 repetitive scans and switched off for the remainder. Thus, while the intensity of the exposure during each repetitive scan is held constant and the time of exposure of each repetitive scan of a pixel is further held constant, the number of times that a pixel is exposed is directly dependant upon the intensity value stored for that pixel in memory 12. Thus, the exposure of recording media for each respective pixel in the memory 12 is time modulated in accordance with that pixel data. This time modulation produces linearity of the time integrated light output of the photon source for different shades of gray produced for different values of intensity of the pixel data.

In an alternate embodiment, photon generator 16 uses two fixed intensity levels with the second level being a multiple of the first level of approximately 10. Exposure controller 24 is constituted by a look-up table receiving the pixel data and the scan count as addressing inputs. The look-up table has data stored therein for determining which of the two intensity levels of photon generator 16 should be activated for each of the repetitive scans in response to each of the possible intensity values of the image pixel data. Typically the initial scans for each of the possible intensity values will activate the higher fixed intensity level of photon generator 16 and the latter of the repetitive scans will activate the lower fixed intensity level. With eight bits of intensity values and 256 possibilities, the entire range could be covered with 25 scans at the higher intensity level and nine scans at the lower intensity level. A pixel value of 138 would result in an exposure during 13 scans at the higher level and 8 scans at the lower level. The order in which the high and low level scans are performed may be determined in accordance with the particular form of the system.

In accordance with the present invention and the embodiment described herein, time modulation of the exposure of the recording media 20 in accordance with the intensity values of the pixel data as opposed to intensity modulation of the photon beam used to expose the recording media 20 avoids all of the inherent linearity problems with intensity modulation. Further avoided is the limited dynamic range of beam intensities, which rarely exceeds 100. The present invention provides a dynamic range which is limited much more by the properties of the recording media than the exposing apparatus. Also eliminated is the cost of an digital-to-analog converter.

The embodiment of the present invention described above is intended to be taken in an illustrative and not a limiting sense. Various modifications and changes to the described embodiment may be made by persons skilled in the art without departing from the intended scope of the present invention as defined in the appended claims.

What is claimed is:

1. Apparatus for recording an image on photon sensitive recording media, comprising:
   a source of image pixel data in digital form having a multiplicity of possible intensity values which multiplicity of intensity values are multiples of a lowest intensity value greater than zero;
   photon generator means for exposing the photon sensitive recording media at a first fixed intensity level corresponding to the lowest intensity value greater than zero, of the pixel data, and at a second fixed intensity level which is a multiple of the first fixed intensity level; and
   means for controlling the amount of time of exposure of the recording media at the first and second intensity levels in correspondence with the pixel data intensity values from the source.

2. The apparatus of claim 1, wherein the means for controlling includes means for causing the photon generator means to perform repetitive scans of the recording media at each of the first and second intensity levels, means for counting the number of each repetitive scan at the respective intensity levels and means, coupled to the means for counting and to receive the pixel data, for activating the photon generator means in response thereto.

3. The apparatus of claim 2, wherein the means for activating the photon generator means includes look-up table means.

4. The apparatus of claim 1, wherein the second intensity level corresponds to approximately ten times the first said intensity level.

5. The apparatus of claim 1, wherein the lowest possible intensity value corresponds to the least significant bit of the pixel data.

6. The apparatus of claim 1, wherein the source includes a memory means, and further wherein the means for controlling includes means for coupling pixel data from the memory means in positional correspondence with the means for scanning.

7. The apparatus of claim 6, wherein the means for scanning includes scan control means, and further wherein the means for coupling pixel data includes addressing means coupled to the memory means and to the scan control means for providing simultaneous control thereof.

8. The apparatus of claim 1, wherein the photon generator means includes a cathode ray tube.

9. A method for recording an image on photon sensitive recording media, comprising the steps of:
receiving image pixel data in digital form with a multiplicity of possible intensity values which multiplicity of intensity values are multiples of a lowest intensity value greater than zero;
exposing the photon sensitive recording media with photons at a first fixed intensity level corresponding to the lowest intensity value greater than zero, of the pixel data, and at a second fixed intensity level which is a multiple of the first fixed intensity level; and
controlling the amount of time of the exposing at the first and second intensity levels in correspondence with the intensity values represented by the pixel data.

10. The method of claim 9, wherein the step of exposing includes scanning at least a portion of the recording media causing an exposure thereof which corresponds to the lowest intensity value, and said step of scanning includes repetitive scanning at each of the first and second intensity levels, and further wherein the step of controlling includes counting the number of each repetitive scan at the respective intensity levels and activating the exposing in response to the pixel data and the counting of the scans.

11. The method of claim 10, wherein the controlling includes coupling the number of each repetitive scan and the pixel data to a look-up table means and using information stored therein for the step of activating.

12. The method of claim 9, wherein the second fixed intensity level corresponds to approximately ten times the first said intensity level.

13. The method of claim 9, wherein the receiving is performed by a memory means, said step of exposing includes the step of scanning at least a portion of the recording media causing an exposure thereof which corresponds to the lowest intensity value, and further wherein the controlling includes coupling pixel data from the memory means in positional correspondence with the scanning.

* * * * *